(12) United States Patent
Wollin et al.

(10) Patent No.: US 7,792,731 B2
(45) Date of Patent: Sep. 7, 2010

(54) CAPITAL-ADEQUACY FILING AND ASSESSMENT SYSTEM AND METHOD

(75) Inventors: Elizabeth Anne Wollin, Vienna, VA (US); Sherilyn Smith Belcher, Baltimore, MD (US); Jung Hun Kim Moon, Washington, DC (US)

(73) Assignee: Financial Industry Regulatory Authority, Inc., Washington, DC (US)

( * ) Notice: Subject to any disclaimer, the term of this patent is extended or adjusted under 35 U.S.C. 154(b) by 482 days.

(21) Appl. No.: 11/434,241

(22) Filed: May 16, 2006

(65) Prior Publication Data

US 2007/0271195 A1 Nov. 22, 2007

(51) Int. Cl.
*G06Q 40/00* (2006.01)
(52) U.S. Cl. .............................. 705/36 R; 705/1; 705/7; 705/8; 705/10; 705/35; 705/38; 705/39; 705/41
(58) Field of Classification Search ...................... 705/1, 705/7, 8, 10, 35, 36 R, 38, 39, 41
See application file for complete search history.

(56) References Cited

U.S. PATENT DOCUMENTS

| | | | |
|---|---|---|---|
| 5,297,032 A | | 3/1994 | Trojan et al. |
| 6,012,042 A | | 1/2000 | Black et al. |
| 6,144,947 A | * | 11/2000 | Schwartz .................. 705/36 R |
| 2002/0046143 A1 | * | 4/2002 | Eder ........................... 705/36 |
| 2002/0128874 A1 | | 9/2002 | McIntosh et al. |
| 2003/0126057 A1 | * | 7/2003 | Grossi et al. .................. 705/36 |
| 2003/0130921 A1 | * | 7/2003 | Force et al. .................... 705/35 |
| 2004/0019511 A1 | * | 1/2004 | McKinney ...................... 705/8 |
| 2004/0034593 A1 | * | 2/2004 | Toneguzzo et al. ............. 705/39 |
| 2004/0078332 A1 | * | 4/2004 | Ferguson et al. .............. 705/41 |
| 2004/0107125 A1 | * | 6/2004 | Guheen et al. .................. 705/7 |
| 2004/0236673 A1 | * | 11/2004 | Eder ............................ 705/38 |
| 2004/0236687 A1 | * | 11/2004 | Tyson-Quah ................. 705/40 |
| 2006/0047561 A1 | * | 3/2006 | Bolton .......................... 705/10 |
| 2006/0116898 A1 | * | 6/2006 | Peterson ......................... 705/1 |
| 2006/0155632 A1 | * | 7/2006 | Cherkas et al. ........... 705/36 R |

OTHER PUBLICATIONS

Wray, L. Randall, "Credit and State Theories of Money", 2004, pp. 144-146 and 154-159.*
Definition of 'Subtract' from dictionary.com, printed on Oct. 30, 2009, 4 pages.*
"Bank for International Settlements Committee on Banking Supervision: Revision of the Risk-Based Capital Standard" by Rob Strand, dated Mar. 31, 2000 from aba.com, 4 pages.*
"Consultative Paper on "A New Capital Adequacy Framework"", Jun. 1999" by James D. McLaughlin, dated Mar. 31, 2000 from aba.com, 7 pages.*

* cited by examiner

*Primary Examiner*—James P Trammell
*Assistant Examiner*—Sanjeev Malhotra
(74) *Attorney, Agent, or Firm*—Finnegan, Henderson, Farabow, Garrett & Dunner, LLP

(57) ABSTRACT

Systems and methods of capital-adequacy filing and assessment for determining compliance with capital-adequacy rules include an authorized-entity computer and a processing computer in electronic communication with the authorized-entity computer. Such systems and methods can include an analysis-rule-configuration component, a data-reception component and a rules engine.

22 Claims, 22 Drawing Sheets

| CAFA FORMS | | | | |
|---|---|---|---|---|
| FILE DATA HELP | | | | |

| | ASSETS | ALLOWABLE | NON-ALLOWABLE | TOTAL |
|---|---|---|---|---|
| General Information | | | | |
| Assets | 1. CASH | 1a [ 0 ] | 1b [ 0 ] | 1c [ 0 ] |
| Liabilities | 2. CASH SEGREGATED IN COMPLIANCE WITH FEDERAL AND OTHER REGULATIONS | 2a [ 0 ] | 2b [ 0 ] | 2c [ 0 ] |
| Ownership Equity | | | | |
| Income Statement | | | | |
| Net Capital | RECEIVABLE FROM BROKERS OR DEALERS AND CLEARING ORGANIZATIONS | | | |
| Net Capital Requirements | 4. FAILED TO DELIVER | 4a [ 0 ] | 4b [ 0 ] | 4c [ 0 ] |
| | 5. SECURITIES BORROWED | 5a [ 0 ] | 5b [ 0 ] | 5c [ 0 ] |
| | 6. OMNIBUS ACCOUNTS | 6a [ 0 ] | 6b [ 0 ] | 6c [ 0 ] |
| | 7. OMNIBUS ACCOUNTS | 7a [ 0 ] | 7b [ 0 ] | 7c [ 0 ] |
| | 8. OTHER | 8a [ 0 ] | 8b [ 0 ] | 8c [ 0 ] |
| | 9. RECEIVABLES FROM CUSTOMERS | 9a [ 0 ] | 9b [ 0 ] | 9c [ 0 ] |
| | 10. SECURITIES ACCOUNTS | 10a [ 0 ] | 10b [ 0 ] | 10c [ 0 ] |
| | 11. CASH AND FULLY SECURED ACCOUNTS | 11a [ 0 ] | 11b [ 0 ] | 11c [ 0 ] |
| | 12. PARTLY SECURED ACCOUNTS | 12a [ 0 ] | 12b [ 0 ] | 12c [ 0 ] |
| | 13. UNSECURED ACCOUNTS | 13a [ 0 ] | 13b [ 0 ] | 13c [ 0 ] |
| | 14. COMMODITIES ACCOUNTS | 14a [ 0 ] | 14b [ 0 ] | 14c [ 0 ] |
| | 15. ALLOWANCE FOR DOUBTFUL ACCOUNTS | 15a [ 0 ] | 15b [ 0 ] | 15c [ 0 ] |
| | 16. RECEIVABLES FROM NON-CUSTOMERS | 16a [ 0 ] | 16b [ 0 ] | 16c [ 0 ] |

FIG. 5

| CAFA FORMS | | | | |
|---|---|---|---|---|
| FILE DATA HELP | | | | |

| | LIABILITIES | | | |
|---|---|---|---|---|
| General Information | | A.I. LIABILITIES | NON-A.I. LIABILITIES | TOTAL |
| Assets | 55. BANK LOANS PAYABLE | 55a [ 0 ] | 55b [ 0 ] | 55c [ 0 ] |
| Liabilities | 56. SECURITIES SOLD UNDER REPURCHASE AGREEMENTS | 56a [ 0 ] | 56b [ 0 ] | 56c [ 0 ] |
| Ownership Equity | PAYABLE TO BROKERS OR DEALERS AND CLEARING ORGANIZATIONS | | | |
| Income Statement | | | | |
| Net Capital | 58. FAILED TO RECEIVE | 58a [ 0 ] | 58b [ 0 ] | 58c [ 0 ] |
| Net Capital Requirements | 59. SECURITIES LOANED | 59a [ 0 ] | 59b [ 0 ] | 59c [ 0 ] |
| | 60. OMNIBUS ACCOUNTS | 60a [ 0 ] | 60b [ 0 ] | 60c [ 0 ] |
| | 61. CLEARING ORGANIZATIONS | 61a [ 0 ] | 61b [ 0 ] | 61c [ 0 ] |
| | 62. PAYABLE TO CUSTOMERS | 62a [ 0 ] | 62b [ 0 ] | 62c [ 0 ] |
| | 63. SECURITIES ACCOUNTS INCLUDING FREE CREDITS OF 63a [ 0 ] | 63b [ 0 ] | | 63c [ 0 ] |
| | 64. COMMODITIES ACCOUNTS | 64a [ 0 ] | 64b [ 0 ] | 64c [ 0 ] |
| | PAYABLE TO NON-CUSTOMERS | | | |
| | 66. SECURITIES ACCOUNTS | 66a [ 0 ] | 66b [ 0 ] | 66c [ 0 ] |
| | 67. COMMODITIES ACCOUNTS | 67a [ 0 ] | 67b [ 0 ] | 67c [ 0 ] |
| | 71. SECURITIES/COMMODITIES SOLD NOT YET PURCHASED AT MARKET VALUE INCLUDING ARBITRAGE OF ACCOUNTS | | 71b [ 0 ] | 71c [ 0 ] |
| | ACCOUNTS PAYABLE AND ACCRUED LIABILITIES AND EXPENSES | | | |

*FIG. 6*

CAFA FORMS
FILE DATA HELP

| General Information | OWNERSHIP EQUITY | | |
|---|---|---|---|
| Assets | CORPORATION | | |
| Liabilities | 92a. PREFERRED STOCK | 92a | 0 |
| Ownership Equity | 92b. COMMON STOCK | 92b | 0 |
| Income Statement | 92c. ADDITIONAL PAID-IN CAPITAL | 92c | 0 |
| Net Capital | 92d. RETAINED EARNINGS | 92d | 0 |
| Net Capital Requirements | 92e. TOTAL EQUITY | 92e | 0 |
| | 92f. LESS CAPITAL STOCK IN TREASURY | 92f | 0 |
| | 92g. OTHER FORMS OF OWNERSHIP EQUITY (PLEASE LIST ON ATTACHMENT) | 92g | 0 |
| | 92h. TOTAL OWNERSHIP EQUITY | 92h | 0 |
| | 92i. TOTAL OWNERSHIP EQUITY PLUS LIABILITIES | 92i | 0 |

SAVE OWNERSHIP EQUITY INFORMATION

*FIG. 7*

CAFA FORMS
FILE  DATA  HELP

| General Information |
| Assets |
| Liabilities |
| Ownership Equity |
| Income Statement |
| Net Capital |
| Net Capital Requirements |

INCOME STATEMENT

REVENUE
  COMMISSIONS
    100a. COMMISSIONS ON TRANSACTIONS IN EXCHANGE LISTED EQUITY SECURITIES EXECUTED ON AN EXCHANGE — 100a [ 0 ]
    100b. COMMISSIONS ON TRANSACTIONS IN EXCHANGE LISTED EQUITY SECURITIES EXECUTED OVER-THE-COUNTER — 100b [ 0 ]
    100c. COMMISSIONS ON LISTED OPTIONS TRANSACTIONS — 100c [ 0 ]
    100d. ALL OTHER SECURITIES COMMISSIONS — 100d [ 0 ]
    100e. TOTAL SECURITIES COMMISSIONS — 100e [ 0 ]

GAINS OR LOSSES ON FIRM SECURITIES TRADING ACCOUNTS
    110a. FROM MARKET MAKING IN OVER-THE-COUNTER EQUITY SECURITIES — 110a [ 0 ]
    110b. FROM TRADING IN DEBT SECURITIES — 110b [ 0 ]
    110c. FROM ALL OTHER TRADING — 110c [ 0 ]

GAINS OR LOSSES ON FIRM SECURITIES INVESTMENT ACCOUNTS
    112a. INCLUDES REALIZED GAINS (LOSSES) — 112a [ 0 ]
    112b. INCLUDES UNREALIZED GAINS (LOSSES) — 112b [ 0 ]
    112d. TOTAL REALIZED OR UNREALIZED GAINS (OR LOSSES) — 112d [ 0 ]
    114. PROFITS (LOSSES) FROM UNDERWRITING AND SELLING GROUPS — 114a [ 0 ]

*FIG. 8*

| CAFA FORMS | |
|---|---|
| FILE DATA HELP | |

| General Information | NET CAPITAL DATA ENTRY | |
|---|---|---|
| Assets | 155. TOTAL OWNERSHIP EQUITY FROM STATEMENT OF FINANCIAL CONDITION | 155a [ 0 ] |
| Liabilities | 156. DEDUCT OWNERSHIP EQUITY NOT ALLOWABLE FOR NET CAPITAL (INCLUDING ANY EQUITY INSTRUMENT FOR WHICH THE HOLDER/INVESTOR HAS A RIGHT OF REDEMPTION) | 156a [ 0 ] |
| Ownership Equity | | |
| Income Statement | 157. TOTAL OWNERSHIP EQUITY QUALIFIED FOR NET CAPITAL | 157a [ 0 ] |
| Net Capital | 158. LIABILITIES SUBORDINATED TO CLAIMS OF GENERAL CREDITORS ALLOWABLE IN COMPUTATION OF NET CAPITAL | 158a [ 0 ] |
| Net Capital Requirements | 159. OTHER DEDUCTIONS OR ALLOWABLE CREDITS (PLEASE LIST ON ATTACHMENT) | 159a [ 0 ] |
| | 160. TOTAL CAPITAL AND ALLOWABLE SUBORDINATED LIABILITIES | 160a [ 0 ] |
| | 165. DEDUCTIONS AND/OR CHARGES | 165a [ 0 ] |
| | 166. TOTAL NON-ALLOWABLE ASSETS FROM STATEMENT OF FINANCIAL CONDITION | 166a [ 0 ] |
| | 167. MARKET VALUE OF ALL SHORT SECURITY DIFFERENCES | 167a [ 0 ] |
| | 168. OPERATIONAL CHARGES RELATING TO SUSPENSE OR RECONCILING DIFFERENCES | 168a [ 0 ] |
| | 170. NET CAPITAL BEFORE MARKET RISK CHARGES ON SECURITIES POSITIONS | 170a [ 0 ] |
| | 172. DEBT SECURITIES ISSUED OR GUARANTEED AS TO PRINCIPAL BY AN OECD MEMBER, LOCAL BANK, OR CORPORATE OR MUNICIPAL ENTITY DOMICILED IN AN OECD COUNTRY WITH A RATING OF BBB+ OR HIGHER | 172a [ 0 ] |
| | 173. CERTAIN MUTUAL FUNDS AND LIQUID ASSET FUNDS | 173a [ 0 ] |
| | 174. CONVERTIBLE DEBT SECURITIES | 174a [ 0 ] |
| | 175. PREFERRED STOCK | 175a [ 0 ] |

*FIG. 9*

CAFA FORMS

FILE  DATA  HELP

NET CAPITAL REQUIREMENTS COMPUTATION

| | |
|---|---|
| BUSINESS ACTIVITY (FROM GENERAL INFORMATION PAGE) | 300b [ 0 ] |
| INITIAL VALUE | 300c [ 0 ] |
| BASELINE VALUE | 300a [ 0 ] |
| TOTAL MONIES OWED TO AUTHORISED PERSON IN EXCESS OF 50% OF NET CAPITAL | 320a [ 0 ] |
| REQUIRED NET CAPITAL | 330a [ 0 ] |
| ACTUAL NET VALUE (ITEM 182a) | 340a [ 0 ] |
| EXCESS NET CAPITAL | 350a [ 0 ] |

Sidebar:
- General Information
- Assets
- Liabilities
- Ownership Equity
- Income Statement
- Net Capital
- Net Capital Requirements

[ SAVE NET REQUIREMENTS CALCULATION INFORMATION ]

| | Exception Type | Authorized Person(s) | Review Period | Description | Exception Date | Filing Date/Time | Status | Analyst | Comments |
|---|---|---|---|---|---|---|---|---|---|
| ▷ ⊞ ☐ | NCGC | Merry | JAN 2005 | Net Capital Getting Close | 7/27/2005 12:20:01 PM | 7/27/2005 12:19:50 PM | Pending | SHER | SHER 7/27 |
| ⊞ ☐ | NC | Merry | JAN 2005 | Net Capital Exception | 7/27/2005 12:20:01 PM | 7/27/2005 12:19:50 PM | Under Review | SHER | 7/27/2005 12:44pm S |
| ⊞ ☐ | SL | Merry | JAN 2005 | Subordinated Loans | 7/27/2005 12:20:01 PM | 7/27/2005 12:19:50 PM | Pending | JUNG | |

CAFA Analysis

Criteria: All Types ▷ | All Authorized Persons ▷ | All Review Periods ▷ | All Status ▷ | All Analysts ▷ | Filter | Refresh Exceptions

- Load Filing(s)
- Analyze Filing(s)
- View Exception Details
- Thresholds
- List of Users
- Quit
- Help
- Staff Workload

Additions/Deductions to Entity's Net Capital

Ending equity current period does not reconcile, check for additions/deductions to capital.

| | | | | |
|---|---|---|---|---|
| Authorized Person | A.G. Edwards | Preparer's Name | Belcher, Sheri | |
| Review Period | SEP 2005 | Preparer's Phone No. | 240-366-6044 | |
| Filing Date-Time | 6/1/2005 3:11:33 PM | Preparer's Email | sbelcher@scwab.com | |

Total Ownership Equity (Previous Period) + Monthly Income (Current Period)    DOES NOT EQUAL    Total Ownership Equity (Current Period)

1,459,894,614    20,093,735      1,486,361,746

Total Ownership Equity (Current Period)    1,486,361,746    Total Ownership Equity (Previous Period)    1,459,894,614

Monthly Income (Current Period)    20,093,735    Monthly Income (Previous Period)    20,821,588

Analyst Comments

FIG. 22

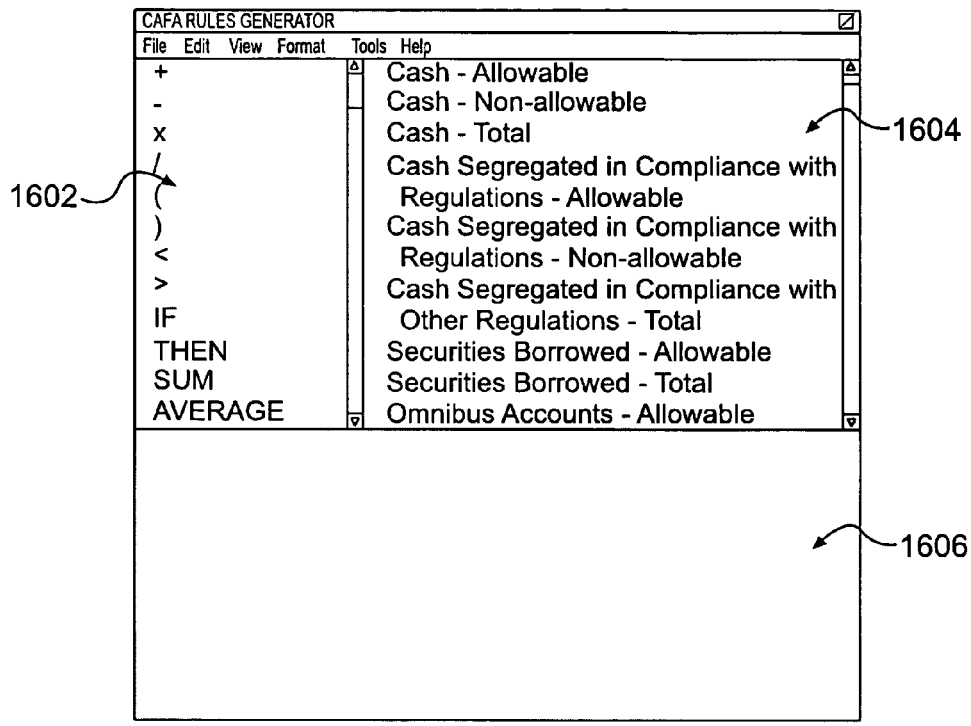

*FIG. 24*

| Description of Threshold | Value |
|---|---|
| # of Months estimated until the Excess net capital is depleted | 6 |
| # of Months for which relevant filing data values will be displayed | 3 |
| % by which Actual Net Capital has to be Greater then Required Net Capital | 150 |
| % of the total revenue for current review period by the new revenue type | 10 |
| % Used to Compare current Excess capital to previous 2 reporting period value | 70 |
| % Used to Compare current Excess capital to previous reporting period value | 80 |
| % used to Compare the Asset Items valuation in respect to firms Net Capital | 10 |
| * | |

*FIG. 25*

CAPITAL-ADEQUACY FILING AND ASSESSMENT SYSTEM AND METHOD

DESCRIPTION OF THE INVENTION

1. Field of the Invention

This invention relates generally to computer systems and more particularly to systems and methods for receiving, processing, and analyzing financial data relating to financial institutions' compliance with capital-adequacy rules.

2. Introduction

The efficient functioning of financial markets requires participants to have confidence in the markets' stability and the ability of participants in the market to fulfill financial obligations. The failure of a financial firm to run its business prudently may cause financial loss to investors and consumers, and possibly insolvency. In addition, such failure may damage confidence in the financial industry as a whole, which would have adverse effects for the financial sector and, potentially, the entire economy.

Capital-adequacy rules govern the amount and management of net capital reserves available to a financial firm or professional. These rules constitute one tool to limit financial losses from mismanagement, and they help foster confidence in the financial industry by setting minimum standards for the financial resources that members of a financial community must maintain. Capital-adequacy rules may also define acceptable behavior by members of a financial community.

The types and requirements of capital-adequacy rules can be complex, and such rules vary widely among financial markets and regulating institutions. The level and types of capital-adequacy rules may also vary with a financial institution's business activity.

Capital-adequacy rules establish the standards that are the basis of analysis for regulators supervising financial institutions by providing objective measures of a financial firm's health and its management behavior. Examples of capital-adequacy rules include the U.S. Securities and Exchange Commission rules on net capital (17 C.F.R. §240.15c3-1 (2006) Net Capital Requirements for Brokers and Dealers).

For the most part, independent or government regulatory bodies establish capital-adequacy rules. In the following description, the term "authorized entity" refers to a firm or entity, such as a securities dealer or brokerage firm, subject to capital-adequacy rules. To determine and ensure compliance with capital-adequacy rules, regulatory bodies require authorized entities to file financial data periodically. As used in this description, the term "compliance" not only includes avoiding violations of rules, but also avoiding behaviors that suggest an impending violation of rules. This type of behavior is often indicated by evaluation of trends in the financial data. To be effective, a regulatory body should provide some method of enforcement to assess and ensure compliance.

Although regulators may review a firm's existing financial statements to ensure compliance with capital-adequacy rules, financial statements alone are not an efficient way to ensure compliance with rule. For example, financial statements are not generally standardized, and they often contain large amounts of information not necessary to assess compliance. Furthermore, they may omit information necessary to assess compliance. Another disadvantage is that the financial statements generally do not make it easy to perform period-to-period trend analysis—a valuable technique in identifying firms with potential problems. As a result of the difficulties with financial statements, regulators generally require firms to make periodic filings directed specifically to the assess requirements of the capital-adequacy rules.

As the number of financial firms subject to the capital-adequacy rules grows, regulators have greater difficulties in processing, reviewing, and assessing the information filed to determine whether firms are complying with the capital-adequacy rules. As a result, some have proposed computer systems that allow regulators to receive and process electronic data to determine compliance with capital-adequacy rules. For the most part, however, these computer systems have proven inadequate for effectively monitoring compliance with capital-adequacy rules in current financial markets. For example, the number of financial markets has grown in recent years to include significant financial markets in many different countries. Several regulatory bodies monitor these financial markets, and each of those bodies may have different capital-adequacy rules. Existing systems for accepting and processing financial data to monitor compliance are generally developed just for one financial market with its own particular set of capital-adequacy rules, and may often not be configurable for financial markets having different capital-adequacy rules.

Another problem of existing systems is that the regulatory staff who determine and interpret capital-adequacy rules often cannot implement such rules themselves in the computer software. For example, when implementing a monitoring system in a new market with different capital adequacy rules, any existing, custom, computer software may need to be extensively reprogrammed to reflect the requirements of the new market. The reprogramming may require technical expertise that the staff does not have because it may involve changing source code or data files and then "rebuilding" the software, recompiling source code to generate object code and linking the object code with libraries of other object code to generate a new executable file.

The systems and methods consistent with this invention overcome these and other drawbacks of existing systems and methods for monitoring compliance with capital-adequacy rules, and offer additional advantages. The claims define the specific invention, which is not limited to the disclosed system and methods.

SUMMARY OF THE INVENTION

An automatic method for determining compliance with capital-adequacy rules consistent with the invention comprises configuring a set of analysis rules; receiving, from an authorized entity at a data processing system, electronic financial data relevant to the capital of an authorized entity; analyzing the received financial data by the data processing system using the configured analysis rules to determine whether the capital of the authorized entity is in compliance with the capital-adequacy rules; and providing a notification of noncompliance when the capital of the authorized entity is not in compliance with the capital adequacy rules.

A capital-adequacy filing and assessment system for determining compliance with capital-adequacy rules consistent with the invention comprises an authorized-entity computer; and a processing computer in electronic communication with the authorized-entity computer. The processing computer includes an analysis rule configuration component that configures analysis rules for analyzing financial data relating to capital-adequacy rules, a data reception component for receiving financial data relating to capital-adequacy rules from the authorized-entity computer, and a rules engine to analyze the financial data relating to capital-adequacy rules received from the authorized-entity computer using the analysis rules configured by the analysis configuration component.

BRIEF DESCRIPTION OF THE DRAWINGS

The accompanying drawings, which are incorporated in and constitute a part of the specification, show exemplary implementations consistent with the invention.

FIG. 5 is a screen shot of an exemplary asset-data form consistent with the present invention.

FIG. 6 is a screen shot of an exemplary liability-data form consistent with the present invention.

FIG. 7 is a screen shot of an exemplary ownership-equity form consistent with the present invention.

FIG. 8 is a screen shot of an exemplary income-data form consistent with the present invention.

FIG. 9 is a screen shot of an exemplary net-capital-data form consistent with the present invention.

FIG. 10 is a screen shot of an exemplary net-capital-requirements-computation form consistent with the present invention.

FIG. 21 is an example of a screenshot that might be used to provide a summary report of exceptions in a system that is consistent with the disclosed invention.

FIG. 22 is a screen shot of an exemplary exception report consistent with the present invention.

FIG. 24 illustrates an example of a rules-generator selection screen consistent with the present invention.

FIG. 25 is a screen shot of an exemplary threshold-configuration feature consistent with the present invention.

Together with the summary description above and the detailed description of the embodiments below, the drawings help explain the principles of the invention.

DETAILED DESCRIPTION OF THE INVENTION

Reference will now be made in detail to implementations consistent with the invention illustrated in the accompanying drawings. In those drawings, like elements and operations use the same reference numbers when possible.

Systems and methods consistent with the invention allow the collection and analysis of financial data relating to capital-adequacy rules. Such systems and methods allow filing such financial data and analyzing it to determine whether an authorized entity is complying with capital-adequacy rules. In general, determining compliance with capital-adequacy rules includes assessing actual rules violations, examining trends suggesting an authorized entity has fallen or may likely fall out of compliance, and evaluating other events of regulatory interest.

An authorized entity, or any other entity, can enter financial data into electronic forms on an authorized entity's computer and transmit the data to a capital-adequacy filing and assessment system. That system receives the data and analyzes the data to determine whether that entity is complying with capital-adequacy rules. Preferably, the system evaluates the collected financial data against capital-adequacy rules, which rules the system can allow a user to adapt to new or different rules easily. For example, a user can configure the rules by selecting a set of rules from a library of existing analysis rules, by generating or editing the rules using a rules generator, or by adjusting threshold values of existing rules.

Figure 1:
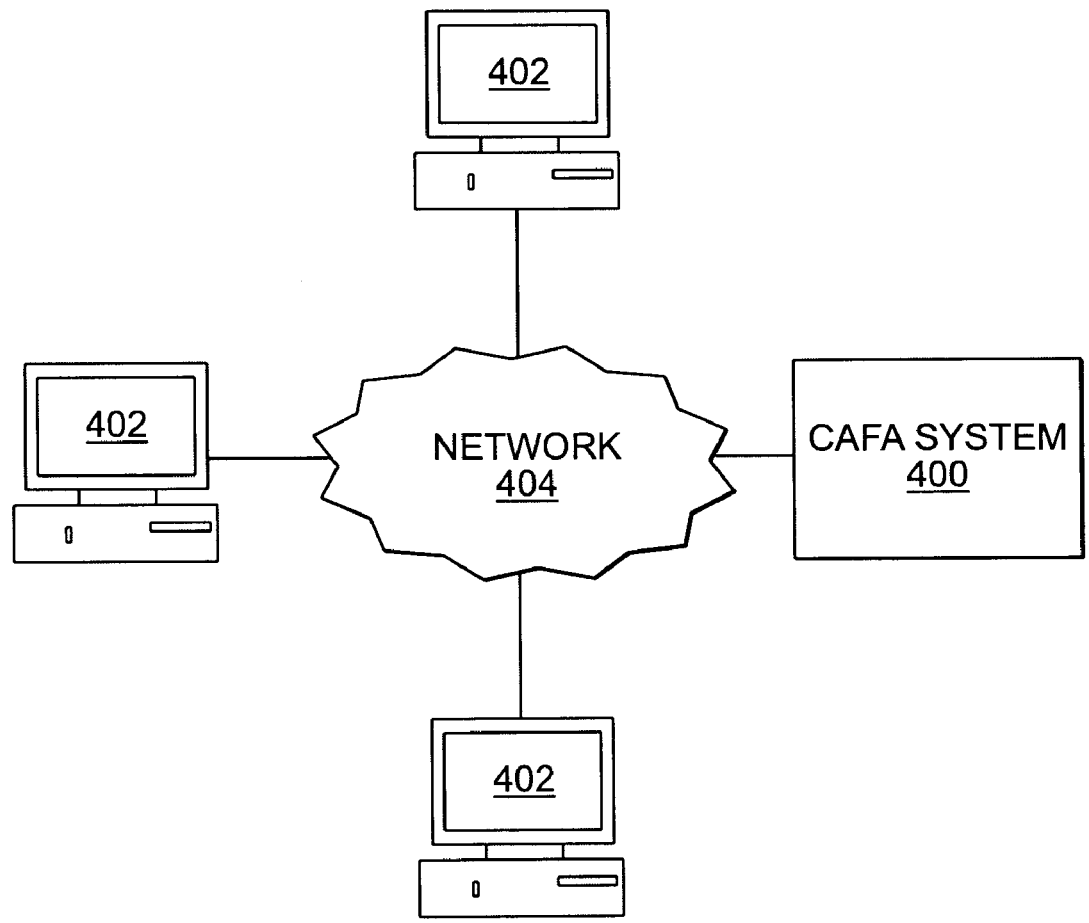
FIG. 1 is a block diagram of an exemplary system consistent with the present invention for collecting and processing financial data to monitor compliance with capital-adequacy.

FIG. 1 is a block diagram of an exemplary system consistent with the invention for collecting and processing financial data to monitor compliance with capital-adequacy. The system of FIG. 1 includes a capital-adequacy filing and assessment (CAFA) system 400, one or more authorized-computers 402, and a network 404. The exemplary system may include any number of authorized-entity computers 402, which can include any type of computer interface. CAFA system 400 connects to computers 402 via network 404, which can be any type of known network, such as the Internet, a Local Area Network (LAN), or a Wide Area Network (WAN). Alternatively, two CAFA systems may be connected to each other by a network to provide redundancy by storing, processing, and analyzing the financial data in parallel or for any other purpose.

Figure 2:
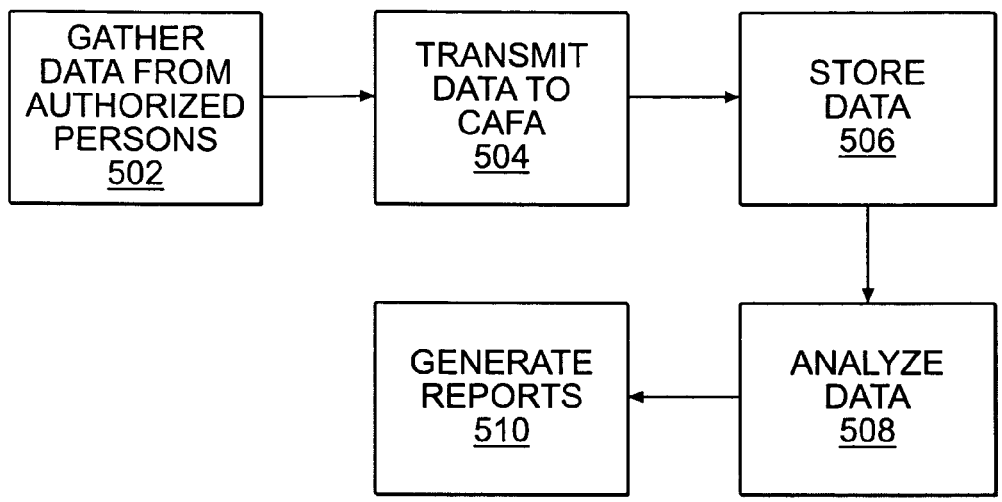
FIG. 2 is a flow diagram of an exemplary method consistent with the present invention for monitoring compliance with capital-adequacy rules.

FIG. 2 is a flow diagram of an exemplary method consistent with the invention for monitoring compliance with capital-adequacy rules. Financial information gathered from an authorized entity (step 502) comes from electronic forms or any other means. The financial information travels over network 404 to CAFA system 400 (step 504). CAFA system 400 stores the financial data (step 506), and may process and analyze the financial data to determine whether the authorized entity is complying with capital-adequacy rules (step 508).

Preferably, CAFA system 400 generates reports based on the results of the processing (step 510). The reports describe the level of compliance with capital-adequacy rules for each authorized entity. The reports can also point out exceptions and errors.

If financial information is gathered using electronic forms, such forms may be accessible through a website, as part of an existing application, or as part of a stand-alone, electronic-filing application. The forms could solicit identifying information for each authorized entity as well as information regarding business activities, assets, liabilities, ownership equity, revenue, income, and resulting net capital.

Figure 3:
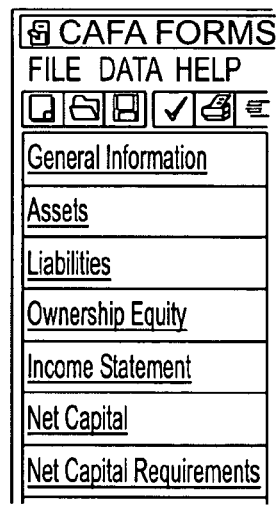
FIG. 3 is a screen shot of an exemplary menu of forms available in an electronic-filing application installed on an authorized-entity computer consistent with the present invention.

FIG. 3 is a screen shot of an exemplary menu of forms, consistent with the present invention, available in an electronic-filing application on an authorized-entity computer 402. Whenever the term "screen shot" is used in this description, it is meant to refer to both complete and partial displays of data. The menu allows an authorized entity to navigate between the electronic forms that collect the data a regulatory body requires. For example, selecting the "General Information" option in the menu displays the General Information form.

Figure 4:
FIG. 4 is a screen shot of an exemplary General Information form consistent with the present invention.

FIG. 4 is a screen shot of an exemplary General Information form consistent with the present invention. This General Information form may be the initial form an authorized entity competes. Other forms may be inaccessible until all of the required general information is supplied. The exemplary General Information form solicits identifying information regarding the authorized entity using a combination of data-entry fields, drop-down menu fields, and radio buttons. The information solicited by the General Information form specifies the type of business of the authorized entity participates to allow selection of the proper capital-adequacy rules, as those rules may vary according to the entity's business activity.

The General Information form (and other forms) may include fields populated by the electronic-filing application. For example, when a user selects the start button at the lower part of the screen, the system may launch a "save as" window to allow the user to save the form on the computer's local hard drive. This example may include a feature that allows other forms to be selected for completion after saving the General Information form.

FIG. 5 is a screen shot of a portion of an exemplary Assets form consistent with the present invention. The Assets form solicits information regarding the authorized entity's cash, secured accounts, customers, clearing relationships, securities inventory and any other financial assets. Assets must be classified as 'Allowable' or 'Non-allowable' in this example to be considered in the capital-adequacy computation. These classifications are established by the regulator and take into account recognized local and/or international accounting standards. The form reflects a series of data elements followed by "Allowable" and "Non-Allowable" fields. The authorized entity preferably enters asset information into these fields. As with the General Information form, the shaded fields of the assets form represent values calculated and populated by the electronic-filing application. For example, field 1$c$ in FIG. 5 represents total cash and is calculated and populated by the electronic-filing application based on the user-entered fields of allowable cash 1$a$ and non-allowable cash 1$b$. The information in the Assets form may be saved on the authorized-entity computer's hard drive.

FIG. 6 is a screen shot of a portion of an exemplary Liabilities form consistent with the present invention. The Liabilities form solicits information regarding the authorized entity's liabilities, including loans, notes, expenses, debts, taxes and any other financial liabilities. Liabilities are classified as 'Aggregate Indebtedness' (A.I.) or 'Non-Aggregate Indebtedness' (non-A.I.) in this example. In general, a regulator establishes these classifications and identifies values to be considered in calculating liabilities for determining capital-adequacy. The form reflects a series of data elements followed by the "A.I. Liabilities" and "Non-A.I. Liabilities" fields. Preferably, the authorized entity enters liability information into these fields. As with the General Information form, the shaded fields of the Liabilities form represent values the electronic filing application calculates and populates. The information in the Liabilities form may be saved to the authorized-entity computer's hard drive.

FIG. 7 is a screen shot of an exemplary Ownership Equity form consistent with the present invention. The Ownership Equity form solicits financial information regarding the authorized entity's stock holdings, retained earnings, and ownership interests, as well as any other financial equity. As with the General Information form, the application calculates the values in the shaded fields of the Ownership Equity form based on the authorized entity's prior inputs, reflecting the total amount of equity, total amount of ownership equity, and the resulting aggregated amount of liabilities and ownership equity. The information in the Owner Equity form may be saved on the authorized-entity computer's hard drive.

FIG. 8 is a screen shot of a portion of an exemplary Income Statement form consistent with the present invention. The Income Statement form solicits financial information relating to the authorized entity's revenue and expenses. The shaded fields of the Income Statement form represent values calculated and populated by the electronic-filing application based on other information entered into the form. The information in the Income Statement form may be saved to the authorized-entity computer's hard drive.

FIG. 9 is a screen shot of a portion of an exemplary Net Capital Data Entry form consistent with the present invention. In this example, the Net Capital Data Entry form solicits financial information regarding qualifying ownership equity, subordinated liabilities, and market-risk charges. An authorized entity can enter the equity, liability, and adjustment information into each field. The shaded fields of the Net Capital Data Entry form represent values calculated and populated by the electronic-filing application based on other information entered into the form. The information in the Net Capital Data Entry form may be saved to the authorized-entity computer's hard drive.

FIG. 10 is a screen shot of an exemplary Net Capital Requirements Computation form consistent with the present invention. The Net Capital Requirements Computation form solicits additional net capital information beyond that requested by the Net Capital Data Entry form of FIG. 9. Specifically, it requests data regarding money owed to the authorized entity. Thus, in field 320$a$, an authorized entity must enter the total monies owed to the authorized entity in excess of fifty percent of net capital. Once again, the shaded fields are calculated and populated by the application.

Once the application gathers all the required information, the electronic-filing application may perform a validation check to ensure the required fields are populated correctly. For example, the application may verify that data supplied for each field has the correct format (e.g., entirely numeric, alphanumeric, etc.). The validation process may also include simple accounting checks. For example, in one embodiment, the application may verify that total assets are greater than zero, the total liabilities are greater than zero, and that the total assets equals total liabilities plus total ownership equity. If the validation is not successful, an error message may be displayed describing the nature of the problem.

Figure 11:
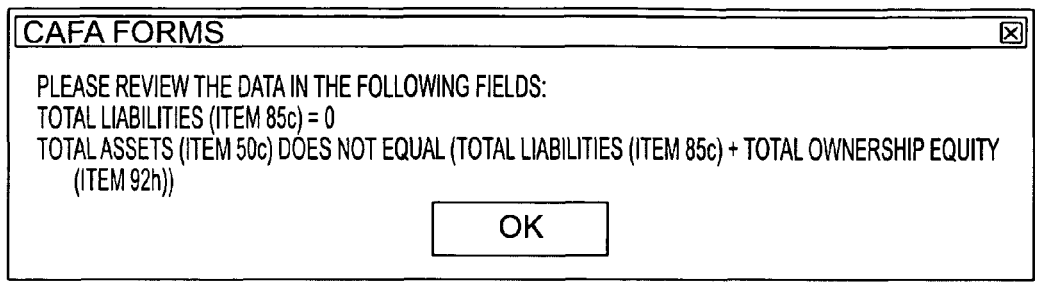
FIG. 11 is a graphical representation of an exemplary error message consistent with the present invention.

FIG. 11 is a screenshot of an exemplary validation error message. If the validation procedure is successful, the application may display a message indicating that the validation was successful and that the forms are ready for submission to the regulatory body.

Once all of the authorized entity information has been collected, it is sent to CAFA system 400 (step 504 in FIG. 2). The mechanism used for this is not important. For example, it could be e-mail; use of a webpage; or an FTP site. For example, when directed to send the forms to CAFA system 400, the application may save all completed forms in two separate file formats, a text file and a PDF file, attach the two files to an email and send the e-mail with the attached files to CAFA system 400 via the network. The files may also be encrypted or compressed prior to transmission to CAFA system 400.

Upon receiving financial data from authorized entities, CAFA system 400 may log and store the received data to manage and record when a particular authorized entity filed financial data. Preferably CAFA system 400 stores the received forms and data in a database.

Figure 12:
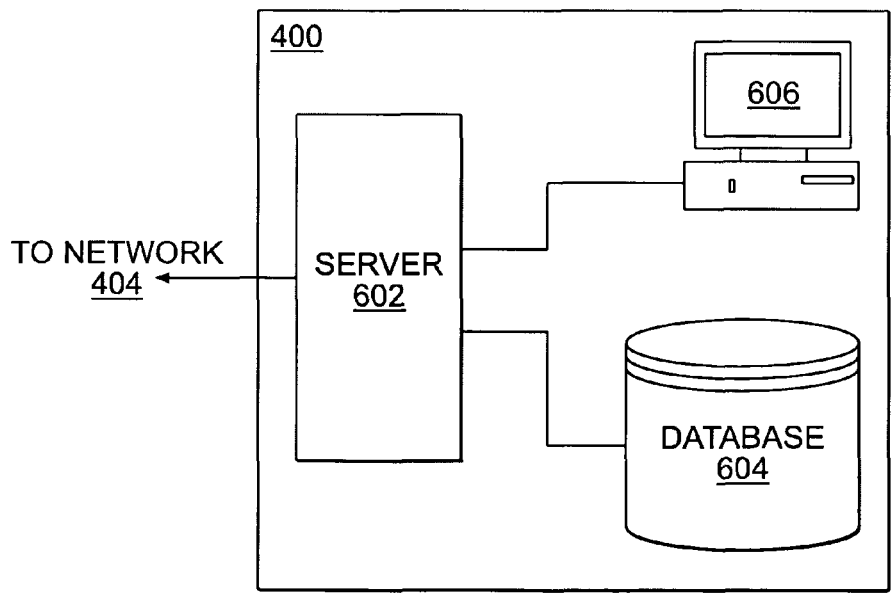
FIG. 12 is a block diagram of an exemplary processing-computer portion of CAFA system consistent with the present invention.

FIG. 12 is a block diagram of an exemplary processing-computer portion of CAFA system 400 consistent with the present invention. System 400 includes a server 602, a database 604, and one or more workstations 606, all of which may be connected to each other by any means, such as by a Local Area Network (LAN). Server 602 may be any type (e.g., Windows 2003 Server), and contains and runs applications used CAFA system 400.

Database 604 may be of any type (e.g., a relational database). Database 604 may store data relating to the CAFA system including financial data and forms received from authorized entities, results of analyses and reports generated by the CAFA system. Workstation 606 can be any type (e.g., a personal computer), and allows access to server 602 and database 604. In this example, server 602 is also connected to network 404.

Figure 13:
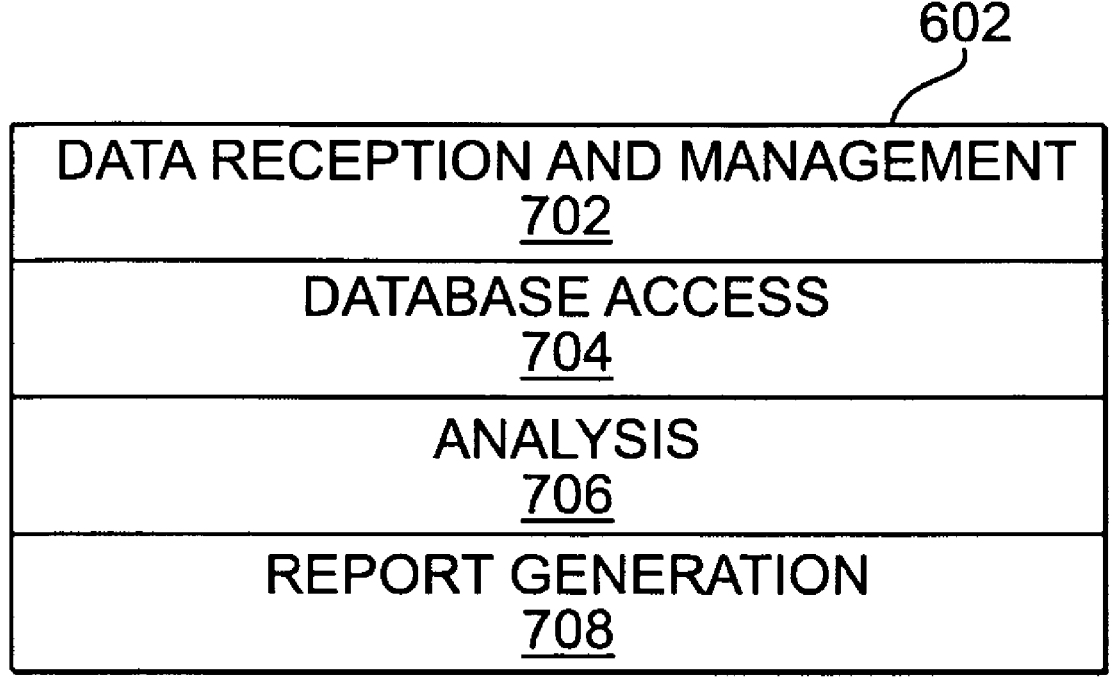
FIG. 13 is a block diagram of a server consistent with the present invention.

FIG. 13 is a block diagram of server 602 consistent with the present invention. Server 602 includes a data-reception and management component 702, a database-access component 704, an analysis (rules) component 706, and a report-generation component 708. The analysis component also acts as a rules engine.

Data-reception and management component 702 allows CAFA system 400 to accept electronic filing data from authorized entities. In one embodiment, forms containing filing data are transmitted from authorized entities to CAFA system 400 by email, and the data acceptance and management component 702 is a Microsoft Exchange Server. In another embodiment, where forms are completed by authorized entities by accessing a website, the data acceptance and management component 702 may be a web server.

Data-reception and management component 702 may also include utilities to log receipt of data from authorized entities, including the name or identifier of the authorized entity, the filing period, and the date of filing. In one embodiment, all received forms are saved in a central location (e.g., the hard drive of the server 602) until the end of a reporting period. At that time, when all forms received during the reporting period are transferred to database 604 using the database-access component 704. Alternatively, forms are transferred to and saved in a database 604 immediately upon receipt by CAFA system 400.

Database-access component 704 may include software to provide data connectivity to the database 604. Database-access component 704 may include Object Linking and Embedding for Databases (OLE DB) capable of interacting with SQL databases.

Analysis component 706 may include software that runs on server 602 to analyze filing data submitted by authorized entities to determine whether authorized entities comply with capital-adequacy rules and to identify trends in filings and in an authorized-entity's behavior.

Report-generation component 708 generates summaries and reports of analyses performed by the system. Component 708 may be a custom program that is part of the analysis component, an off-the-shelf software program, or any other means of report generation.

Once collected and transmitted to CAFA system 400, the financial data for an authorized entity must be evaluated relative to the capital-adequacy rules. FIGS. 14 through 20 are flow diagrams of steps analysis component 706 performs consistent with the present invention to determine compliance with capital-adequacy rules.

Figure 14:
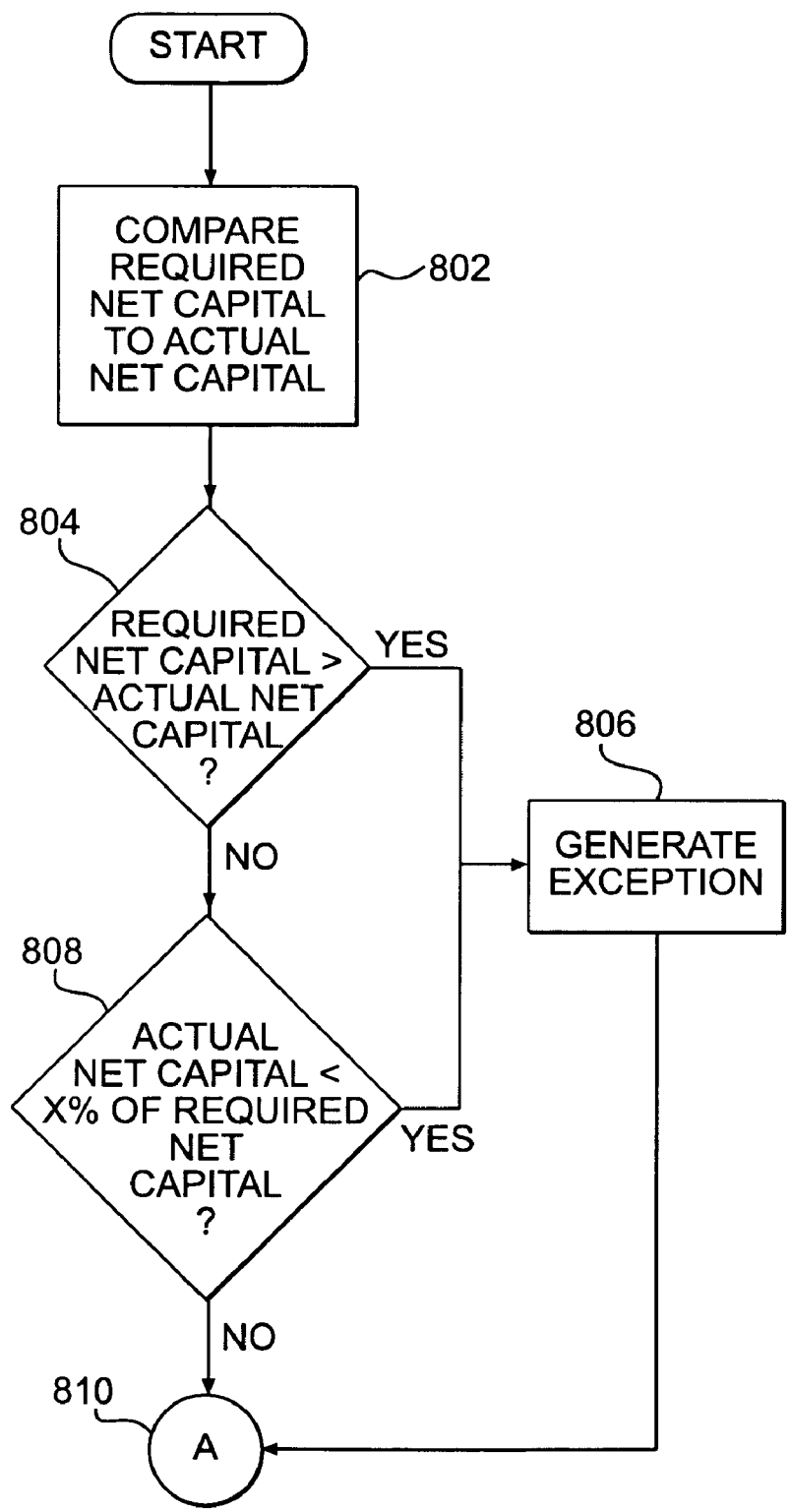
FIG. 14 is a flow diagram of a method consistent with the present invention to determine whether an authorized entity has sufficient net capital for the type of business the authorized entity conducts.

FIG. 14 is a flow diagram of a method consistent with the present invention to determine whether the authorized entity has sufficient net capital for the type of business the authorized entity conducts. In this exemplary method, analysis component 706 compares required net capital to the actual net capital using collected and stored authorized-entity information (step 802). If the required net capital is greater than the actual net capital (step 804), analysis component 706 notes a lack of compliance, and may generate an exception message (step 806) such as "actual net capital is less than required."

If, on the other hand, the required net capital is less than the actual net capital (step 804), analysis component 706 does not generate an exception message, but compares the actual net capital to a threshold percentage of the required net capital (step 808) to determine whether the net capital is approaching the required net capital. If so, analysis component 706 notes this as a potential problem, and may generate an exception message (step 806) such as "actual net capital less than 120% of required net capital." If the actual net capital is greater than the threshold amount, the system does not produce an exception message.

Figure 15:
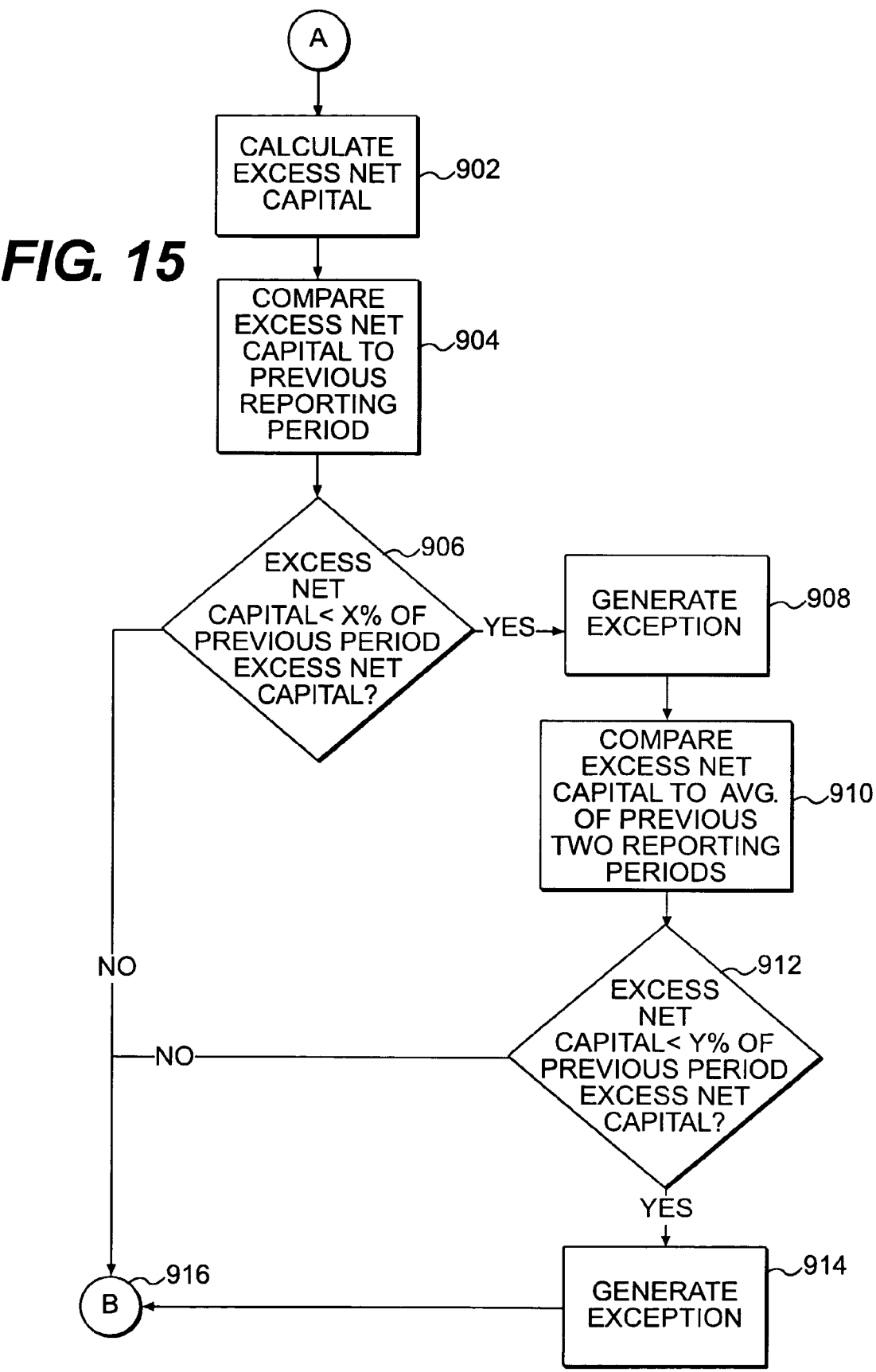
FIG. 15 is a flow diagram of a method consistent with the present invention to determine whether an authorized entity is experiencing erosion of excess net capital.

FIG. 15 is a flow diagram of a method consistent with the present invention to determine whether an authorized entity is experiencing erosion of excess net capital. The system first calculates excess net capital (step 902) by subtracting the required net capital from the actual net capital. The system then compares the calculated excess net capital value with the excess net capital value for the previous reporting period (step 904). If the current excess net capital value is at least a certain threshold percentage of the value of the authorized entity's excess net capital of the prior reporting period (step 906), analysis component 706 does not note a problem, and does not generate an exception.

When an authorized entity's excess net capital is less than that threshold amount (step 906), however, analysis component 706 notes and generates an exception (step 908), and further assesses the authorized entity's excess net capital. For example, the system compares the excess net capital to the average value of the authorized entity's excess net capital for the previous two reporting periods (step 910). When, for example, the authorized entity's excess net capital for the reporting period is equal to or greater than a threshold percentage of the average excess net capital for the two prior reporting periods (step 912), analysis component 706 does not generate an exception. If, on the other hand, the excess net capital for the reporting period is less than the threshold amount (step 912), the analysis component 706 notes an exception and generates an exception, including and exception message (step 914) such as "excess net capital is eroding."

Figure 16:
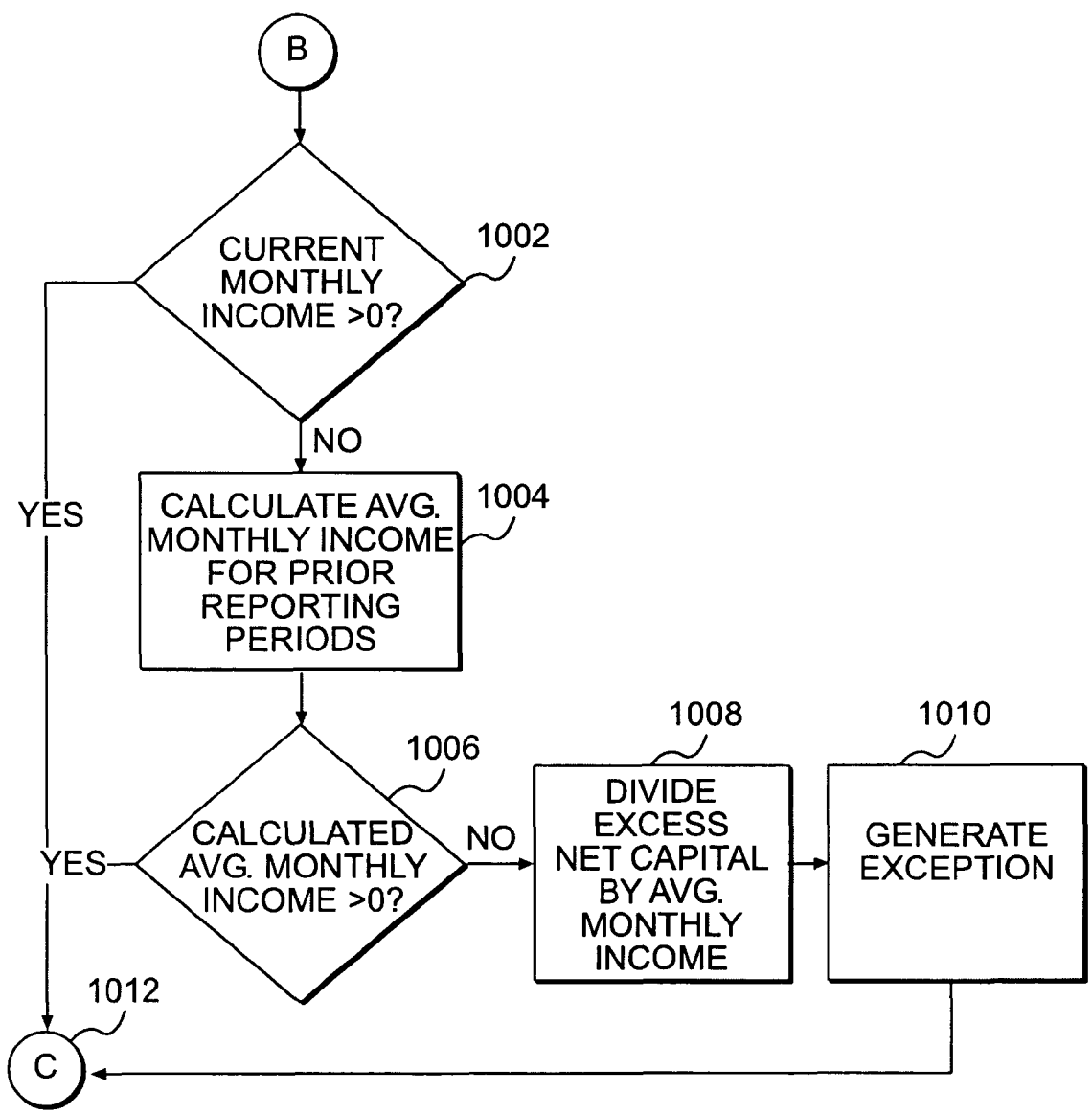
FIG. 16 is a flow diagram of a method consistent with the present invention to determine whether an authorized entity is experiencing losses and the rate of such loss in order to estimate the number of months of current losses that will deplete the current level of excess net capital.

FIG. 16 is a flow diagram of a method consistent with the present invention to determine whether an authorized entity is experiencing losses and the rate of loss so as to determine the number of months of current losses that will deplete the current level of excess net capital. Analysis component 706 determines whether the reported monthly income is equal to or greater than zero (step 1002). If yes, then component 706 does not generate an exception, and proceeds to additional analyses (step 1012).

If the current monthly income is less than or equal to zero, analysis component 706 calculates an average monthly income for the previous six reporting periods (step 1004). If the average monthly income is greater than zero (step 1006), analysis component 706 does not generate an exception, and proceeds with additional analyses (step 1012).

If the average monthly income is less than zero (step 1006), component 706 divides the current excess net capital by the average monthly income (step 1008) to estimate the number of months the authorized entity can continue business operations before depleting excess net capital. Component 706 then generates an exception message (step 1010) such as "3.2 months to deplete excess net capital."

Figure 17:
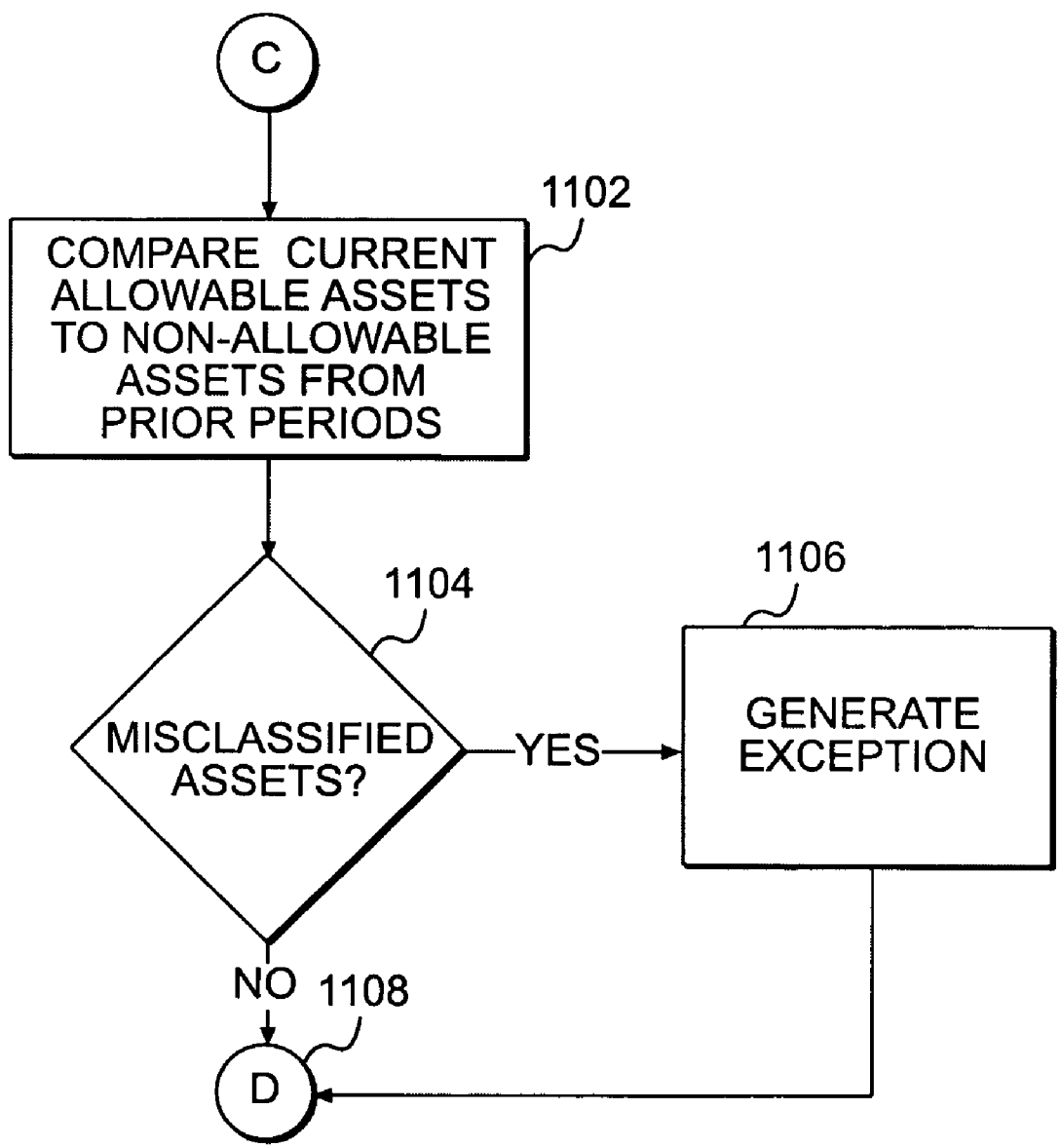
FIG. 17 is a flow diagram of a method consistent with the present invention, to identify misclassification of non-allowable assets by an authorized entity.

FIG. 17 is a flow diagram of a method, consistent with the present invention, to identify any misclassification of non-allowable assets by an authorized entity. Analysis component 706 compares current reporting period "Allowable" asset data to "Non-allowable" asset data from prior reporting periods (step 1102). From this comparison, analysis component 706 determines whether assets have been misclassified (step 1104). For example, if assets identified as "Allowable" in the current reporting period are identified as "Non-allowable" in the prior reporting period, analysis component 706 generates an exception report (step 1106), such as "Field label _____ was treated as 'Non-Allowable' in prior reporting period." If there are no misclassified assets, analysis component 706 does not generate an exception.

Figure 18:
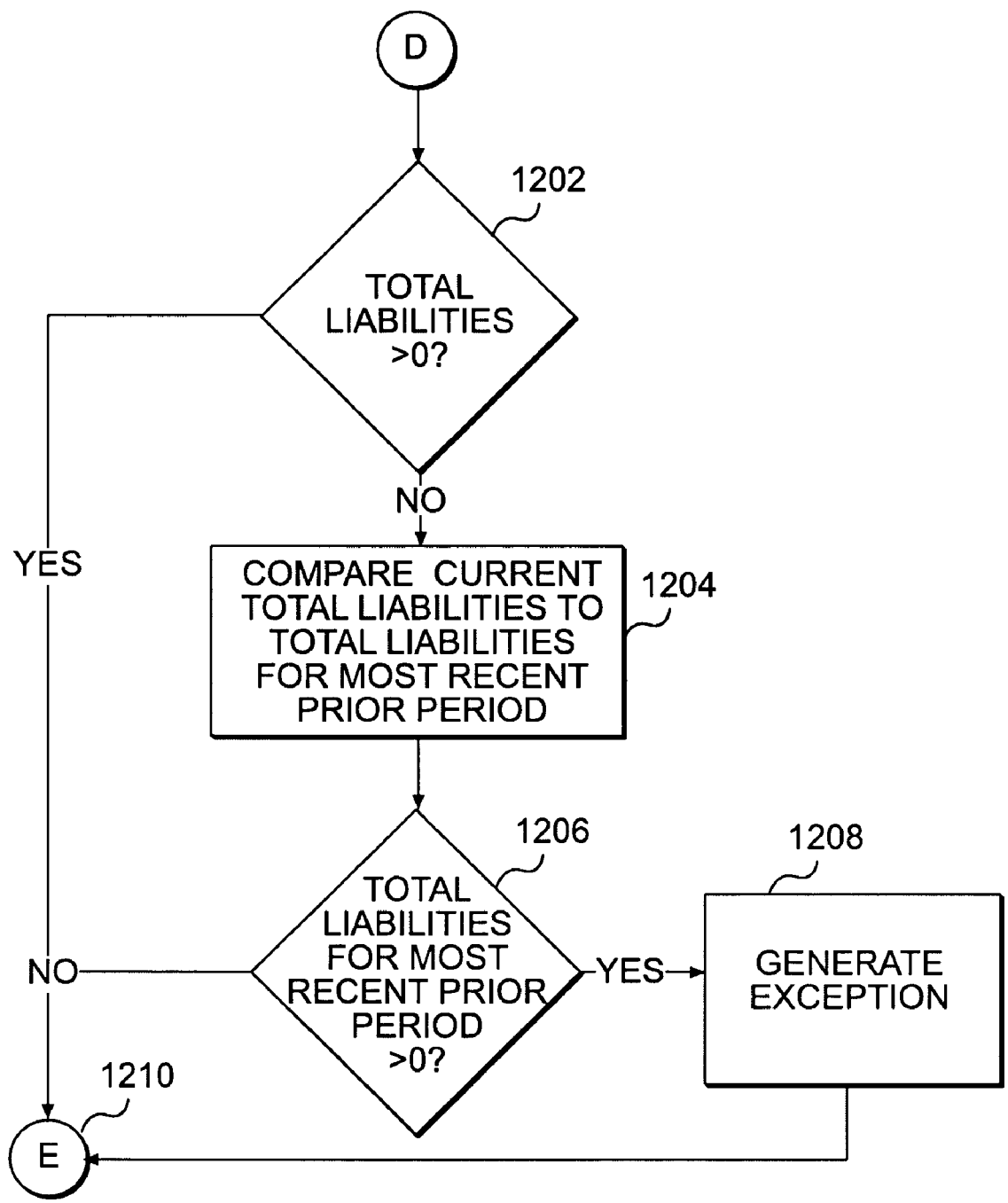
FIG. 18 is a flow diagram of a method, consistent with the present invention to determine whether the current total liabilities are zero, and if so, to determine whether this result is an anomaly for the authorized entity.

FIG. 18 is a flow diagram of a method, consistent with the present invention, to determine whether the current total liabilities are zero, and if so, to determine whether this is an anomaly for the authorized entity. First, analysis component 706 determines whether the current total liabilities are greater than zero (step 1202). If so, component 706 generates no exception and performs additional analyses (step 1210).

If the current liabilities are not greater than zero, analysis component 706 compares the current total liabilities reported by the authorized entity to the total liabilities from the most-recent prior reporting period (step 1204). If the total liabilities for the most recent prior reporting period are also not greater than zero (step 1206), analysis component 706 generates no exception and performs additional analyses (step 1210). If, on the other hand, the total liabilities for the most recent prior reporting period are greater than zero (step 1206), then analysis component 706 generates an exception report (step 1208) such as "no liabilities accrued for current reporting period."

Figure 19:
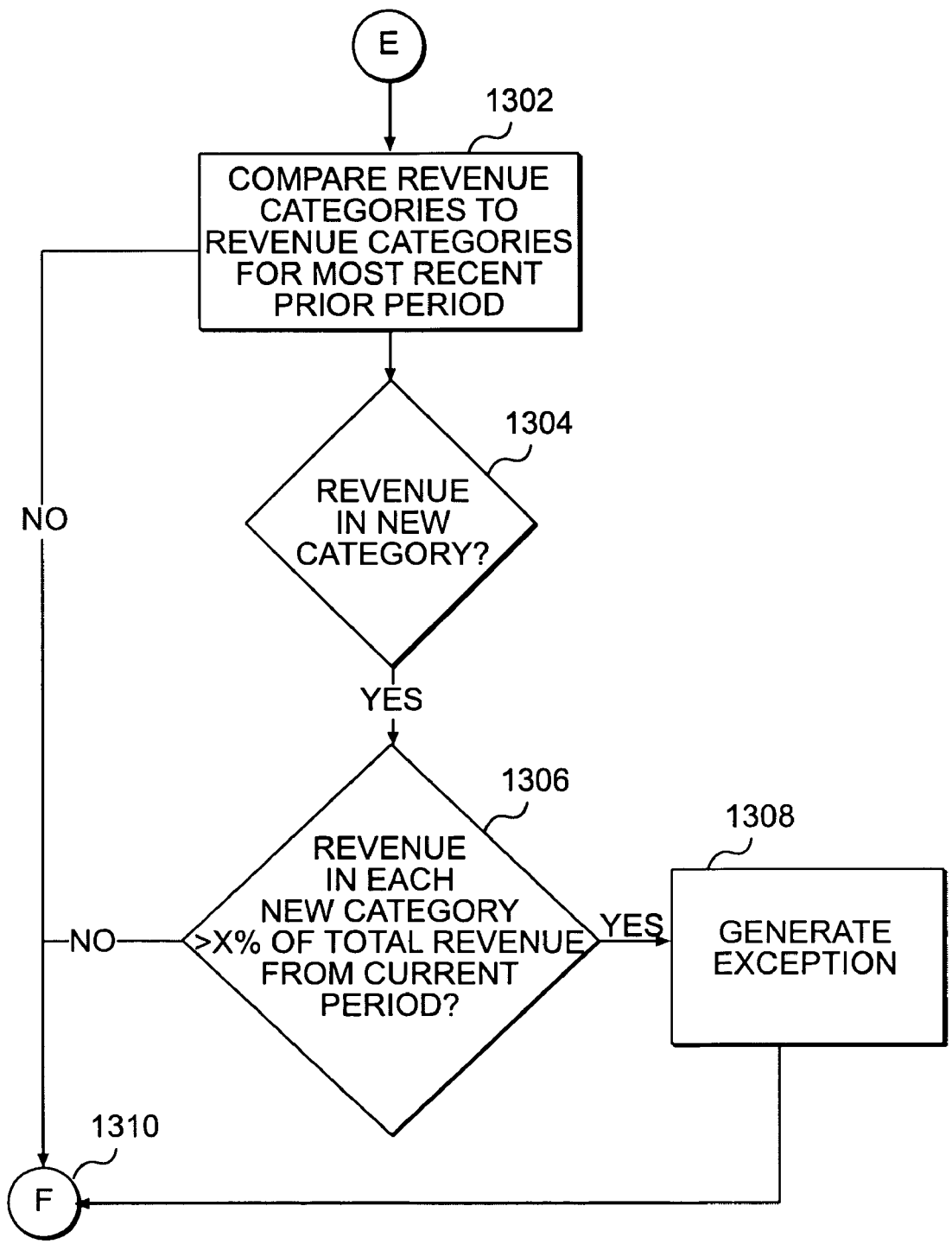
FIG. 19 is a flow diagram of a method consistent with the present invention to determine whether the authorized entity has identified a new revenue type.

FIG. 19 is a flow diagram of a method consistent with the present invention to determine whether the authorized entity has identified a new revenue type. First, analysis component 706 compares the categories for which revenue was reported to the categories for which revenue was reported in the most recent prior reporting period (step 1302). In one embodiment, analysis component 706 compares Total Securities Commissions, Total Gains (or Losses), Total Realized and Unrealized Gains (or Losses), Profits (or Losses) from Underwriting and Selling Groups, and Other Revenue for current reporting period to the same revenue categories for prior reporting period. Using that comparison, analysis component 706 determines whether there is revenue in a new category (step 1304). If there are no differences between the current and previous reporting period in which categories revenue was reported, analysis component 706 generates no exception and performs additional analyses (step 1310).

If any of the current revenue categories were not present in the most recent reporting period filing, analysis component 706 compares each new revenue category value to the current reporting period filing's total revenue (step 1306). If each new revenue category value does not exceed a specified threshold percentage of the total revenue for the current reporting period, analysis component 706 generates no exception and performs additional analyses. (step 1310). If, however, any new revenue category value is greater than the threshold percentage of the value of total revenue for the current reporting period, analysis component 706 generates an exception (step 1308) that identifies the new revenue type.

Figure 20:
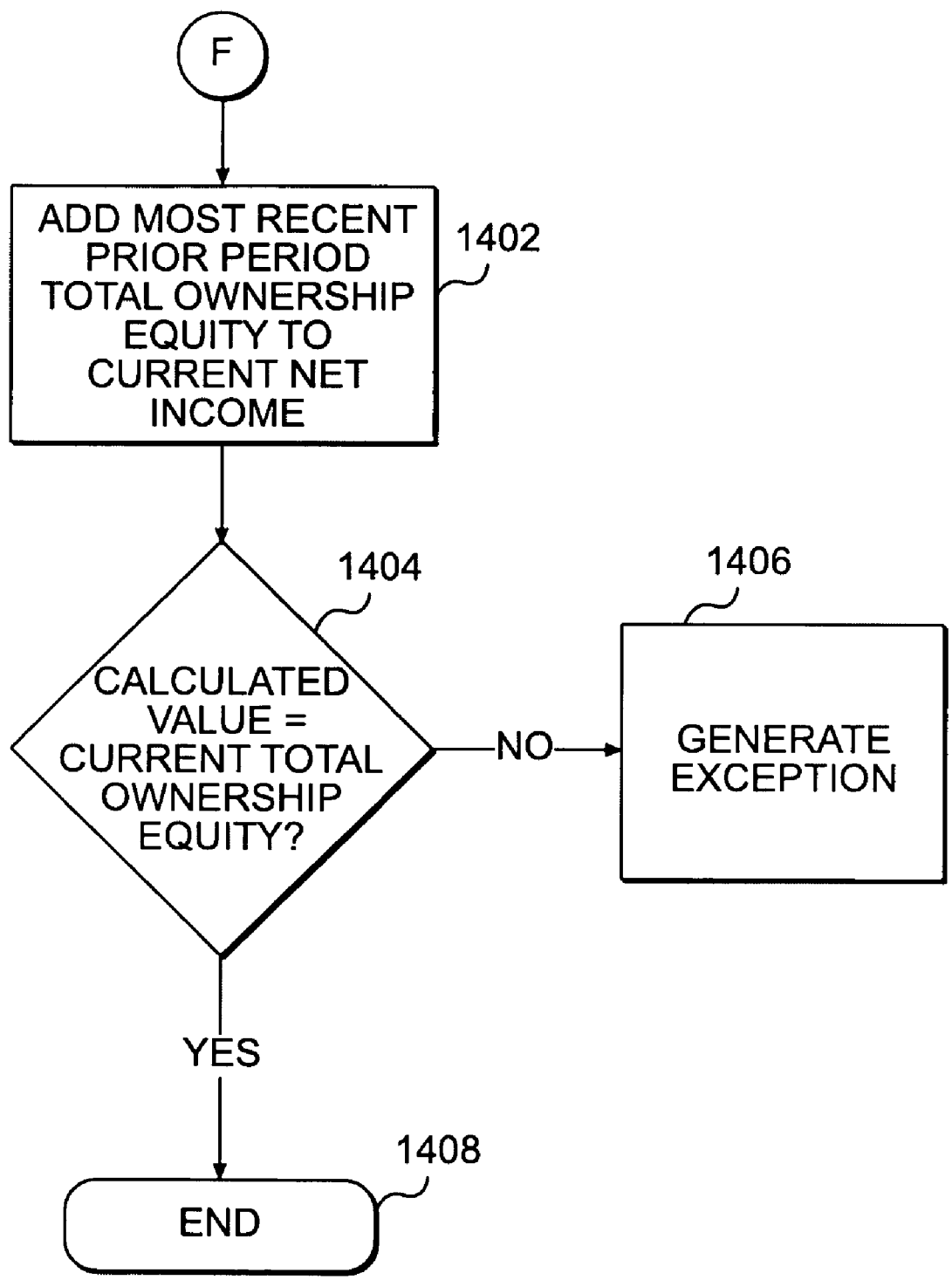
FIG. 20 is a flow diagram of a method consistent with the present invention to determine whether the equity data reported by the authorized entity reconciles.

FIG. 20 is a flow diagram of a method, consistent with the present invention, to determine whether the equity data reported by the authorized entity reconciles. First, the system adds the current net income (step 1402) to the total ownership equity from the last reporting period. If the resulting value of that calculation is equal to the current total ownership equity (step 1404), analysis component 706 generates no exception and the analysis concludes (step 1408). However, if the resulting value of that calculation is not equal to the total ownership equity of the current period, analysis component 706 generates an exception (step 1406).

The report-generation component 708 provides information about the analysis performed on data received from authorized entities. For example, the report generation component provides information about exceptions generated during the analysis of the data received from authorized entities. The reports generated can be standardized to provide predetermined data relating to the analysis. Alternatively, the reports generated can be customized to include user-defined results of the analysis. For example, depending on the criteria chosen for the report generation, reports can be generated that include information and data related to exceptions of a particular type or for exceptions during a particular time period. In another example, customized reports can be created by specifying the data to include in the report using a variety of criteria including the review or filing period, name or identifier of an authorized entity, exception type, status of exception, or any combination thereof.

FIG. 21 is an example of a screenshot consistent with the present invention that provides a summary report of exceptions in a system. The summary table provides the exception type, the name of the authorized entity, the review (filing) period, a description of the exception, the date that the exception was generated, the filing date, the status, the analyst responsible for the exception, and comments. The exceptions displayed in the summary report of exceptions are determined by the criteria used to generate the report. Using an interface such as that shown in FIG. 21, the criteria for generating the summary of exceptions may be specified using drop-down menus near the top of the screen. Here, the user may select the exception type, authorized entity, review period, exception status and/or assigned analyst. The summary of exceptions screen shown in FIG. 21 also includes a "View Exception Details" button that provides the analyst with more in-depth detailed information regarding the reason that a specific exception was generated along with the data in question.

FIG. 22 is a screen shot of an exemplary exception report consistent with the present invention. This example shows a display of the details of an exception generated because an authorized entity's additions/deductions to the firm's capital do not reconcile. In general, the information displayed through "View Exception Details" provides additional detail and context regarding the exception. The information indicates the reasons for the exception, the contact information for the authorized entity, and, if applicable to the exception, the historical information relied upon in determining the generation of the exception.

Each exception generated during analysis has information associated with it. For example, each exception may have associated with it an exception type, an identifier or name of the authorized entity, the review (filing) period, a description of the exception, the date that the exception was generated, the filing date, the status of the exception, the analyst responsible for the exception, and comments relating to the exception. This information can be used to track the exception, to keep records, and to avoid duplication of effort by other analysts. For example, some exception types may require regulatory staff (an analyst) to perform additional tasks such as contacting the authorized entity to gain additional information.

The "Status," "Analyst," and "Comments" information associated with an exception can be used to track of the status the exception, is the entity responsible for it, and the action taken. Referring again to FIG. 21, the summary of exceptions report screen displays information associated with each exception. The "Status" field for the listed exceptions indicates what action, if any, is currently being taken with regard to a particular exception. For example, the status can be pending, under review, on hold, or resolved. The "Analyst" field identifies the analyst responsible for the particular exception, and the "Comments" field records any notes or comments about the exception including what actions have been taken toward investigating or resolving the exception. For example, a user can change the status, update the responsible analyst information, and add comments to reflect the current status, responsible analyst, and actions taken relating to the exception. By maintaining the information about the status, responsible analyst, and comments associated with each exception, analyst resources can be focused on pending exceptions and duplication of effort can be avoided. For example, as described above, a report can be created to identify all exceptions with a status of "pending" or all exceptions that are not assigned to an analyst.

Systems consistent with the present invention can be easily configured to use a particular set of capital-adequacy rules. Such customization allows the system to be implemented in a variety of different markets that may have different capital-adequacy rules without extensive reprogramming. Similarly, an easily configurable system can be modified to reflect changes to the capital-adequacy rules of the particular market.

Systems and methods consistent with the present invention do not depend on any specific mechanism. Such mechanisms can include selecting analysis rules from a library of existing analysis rules, creating rules using a rules generator, or changing thresholds and other numerical values of existing analysis rules.

A CAFA system and method consistent with the present invention may include a library of preprogrammed analysis rules. A user may select one or more analysis rules from the library that the CAFA then uses for determining capital-adequacy rules.

Figure 23:
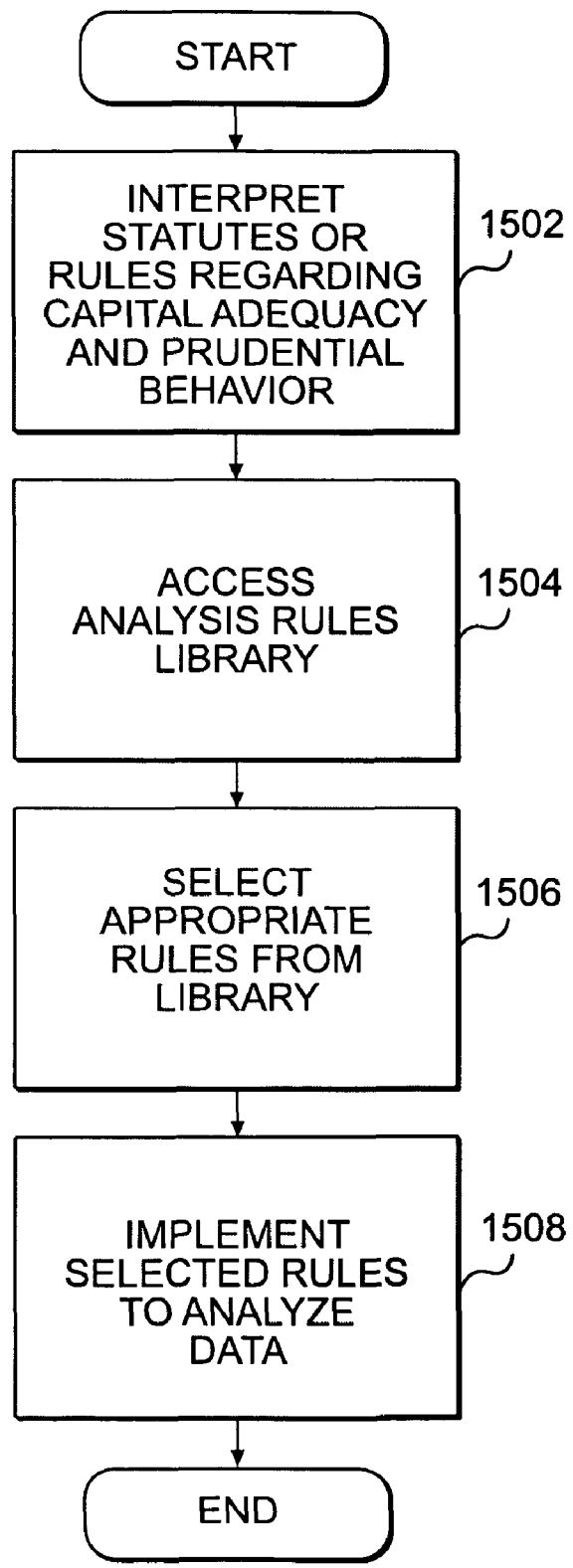
FIG. 23 shows one example of a process for configuring a CAFA system consistent with the present invention.

FIG. 23 shows one example of a process for configuring a CAFA system consistent with the present invention. Initially, a regulatory analyst reads and interprets existing statutes or rules regarding required capital for authorized entities (step 1502). Next, the regulatory analyst accesses the analysis rules library (step 1504). Then, the analyst selects those analysis-rules that most appropriately determine reflect the interpreted rules or statutes (step 1506). Finally, the selected rules are implemented to analyze financial data received from authorized entities to determine compliance with capital-adequacy rules (step 1508).

Alternatively, the regulatory analyst can create custom analysis rules to analyze data to determine compliance with capital-adequacy rules. In such an embodiment, a regulatory analyst uses a conventional rules generator to create custom analysis rules. The rules generator may be any type including commercially available business rules management software. In one example, the rules generator provides a list of data quantities collected from authorized entities and a list of operations that can be performed on the data. A regulatory analyst can build custom analysis rules by selecting data quantities and operators.

FIG. 24 illustrates an example of a rules-generator selection screen. This example shows two lists: an available data list 1604; and an operations list 1602. FIG. 24 also shows a rule-building area 1606. Here, a regulatory analyst may select available data and operators from the lists and drag them to the rule-building area 1606. The analyst may also use a keyboard to enter numerical values as part of the rule-generation process. By arranging the available data, operations, and numerical values in the rule building area, the analyst constructs analysis rules. For example, a regulatory analyst could select and drag available data and operations to the rule building area to construct a rule to determine whether the equity data reported by the authorized entity reconciles. Such a rule might have the following form:

IF (Prior Total Ownership Equity+Net Income Value) ≠Current Total Ownership Equity THEN Generate Exception The analysis rules may also be customizable by changing numerical values in existing analysis rules. For example, an analyst can adjust the thresholds in the analysis rules to tailor existing analysis rules to new markets with different capital-adequacy rules, or to adjust existing analysis rules when the capital adequacy rules within a market change.

FIG. 25 is an exemplary screen shot of a threshold-adjustment feature consistent with the present invention. The screen shot displays a description of each threshold along with the current value of the threshold. Using this screen shot, an analyst can change the value of the threshold by overwriting the displayed value and selecting the Update/Save button.

In one example of a CAFA system consistent with the present invention, the analysis rules may be identified using any one or combination of: preprogrammed analysis rules; rules selected from a library of existing analysis rules; and analysis rules created using a rules generator. A CAFA system consistent with the disclosed invention can allow numerical values and thresholds used in any of these analysis rules to be adjusted using any appropriate methods.

Systems and methods consistent with the present invention are not limited to the embodiments shown. For example, the CAFA system can include a reporting function that allows users to query the database to extract any information about authorized entities of interest. In addition, users can use standard software to chart the stored data to provide graphical reports. As another alternative, the users can customize the forms themselves so that the forms can evolve as well as the rules. Also, although the implementations discussed are Windows™-based, they could be web-based, or used any other acceptable software, Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An automatic method for determining compliance of an authorized entity with capital-adequacy rules, the authorized entity selected from a plurality of entities, the method comprising:
   configuring a set of analysis rules associated with the authorized entity;
   receiving, from the authorized entity at a data processing system, electronic financial data relevant to capital of the authorized entity;
   analyzing the received electronic financial data by the data processing system using the configured set of analysis rules, the analyzing further comprising:
      determining whether the capital of the authorized entity is in compliance with the capital-adequacy rules;
      determining, from the received electronic financial data, an existing net capital of the authorized entity;
      determining, from the configured set of analysis rules, a required net capital for the authorized entity;
      calculating an excess net capital by subtracting the required net capital from the existing net capital; and
      determining an erosion of the excess net capital; and
   providing a notification of noncompliance when the capital of the authorized entity is not in compliance with the capital-adequacy rules.

2. The method of claim 1, wherein configuring the set of analysis rules includes:
   selecting analysis rules from a library of analysis rules.

3. The method of claim 1, wherein configuring the set of analysis rules includes:
   creating analysis rules using a rules generator.

4. The method of claim 1, wherein configuring the set of analysis rules includes:
   designating a threshold value for analysis rules.

5. The method of claim 1, wherein analyzing the received electronic financial data includes:
   determining whether the existing net capital of the authorized entity is greater than the required net capital for the authorized entity.

6. The method of claim 1, wherein determining the erosion of the excess net capital includes:
   calculating an excess net capital value for a current period and a prior period; and
   comparing the excess net capital value for the current period with the excess net capital value for the prior period to determine if there is a loss of the excess net capital greater than a predetermined threshold.

7. The method of claim 1, wherein analyzing the received electronic financial data includes:
   determining whether the authorized entity is experiencing losses.

8. The method of claim 7, wherein analyzing the received electronic financial data further includes:
   determining a rate of losses if the authorized entity is experiencing losses.

9. The method of claim 8, wherein determining the rate of losses includes:
   determining an average monthly income for at least one previous reporting period; and
   dividing current excess net capital by the average monthly income, if the average monthly income is negative, to estimate a time for the authorized entity to deplete the current excess net capital.

10. The method of claim 1, wherein analyzing the received electronic financial data includes:
    determining whether the authorized entity has identified a new revenue type.

11. The method of claim 1, wherein the received electronic financial data includes equity data, and wherein analyzing the received electronic financial data includes:
    determining whether the equity data reported by the authorized entity reconciles.

12. The method of claim 11, wherein determining whether the equity data reported by the authorized entity reconciles includes:
    adding data representing a current net income to data representing a total ownership equity from a prior reporting period; and
    determining whether a resulting sum equals data representing a current total ownership equity.

13. The method of claim 1, wherein receiving the electronic financial data includes:
    receiving data required to be filed with a regulatory authority.

14. The method of claim 1, wherein analyzing the received electronic financial data includes:
    generating an exception condition if the authorized entity does not comply with the capital-adequacy rules.

15. The method of claim 14, wherein analyzing the received electronic financial data further includes:
    associating information relating to an exception with the generated exception condition.

16. The method of claim 15, wherein the information related to the exception includes a status of the exception.

17. The method of claim 15, wherein the information related to the exception includes an identifier of an analyst responsible for the exception.

18. The method of claim 15, wherein the information related to the exception includes a record of actions taken relating to the exception.

19. The method of claim 15, further including:
    tracking the exception using the information related to the exception.

20. The method of claim 1, wherein providing the notification includes:
    generating a report with results of an analysis.

21. The method of claim 20, wherein the report is customized to include user-designated results.

22. The method of claim 1, wherein receiving the electronic financial data includes receiving electronic forms that include financial data.

* * * * *